(12) United States Patent
Vilella

(10) Patent No.: US 11,589,142 B2
(45) Date of Patent: *Feb. 21, 2023

(54) MUTUALLY SECURE OPTICAL DATA NETWORK AND METHOD

(71) Applicant: Joseph L. Vilella, San Diego, CA (US)

(72) Inventor: Joseph L. Vilella, San Diego, CA (US)

(*) Notice: Subject to any disclaimer, the term of this patent is extended or adjusted under 35 U.S.C. 154(b) by 120 days.

This patent is subject to a terminal disclaimer.

(21) Appl. No.: 17/377,223

(22) Filed: Jul. 15, 2021

(65) Prior Publication Data

US 2021/0345026 A1   Nov. 4, 2021

Related U.S. Application Data

(63) Continuation of application No. 17/128,042, filed on Dec. 19, 2020, now Pat. No. 11,070,898, which is a continuation of application No. 16/600,302, filed on Oct. 11, 2019, now Pat. No. 10,904,649, which is a continuation of application No. 16/431,602, filed on Jun. 4, 2019, now abandoned, which is a continuation-in-part of application No. 15/351,315, filed on Nov. 14, 2016, now abandoned, which is a continuation-in-part of application No. 14/419,092,
(Continued)

(51) Int. Cl.
*H04Q 11/00* (2006.01)
*H04L 29/06* (2006.01)
*H04L 9/40* (2022.01)
*H04B 10/27* (2013.01)

(52) U.S. Cl.
CPC ......... *H04Q 11/0067* (2013.01); *H04B 10/27* (2013.01); *H04L 63/0414* (2013.01); *H04Q 2011/0073* (2013.01); *H04Q 2011/0086* (2013.01)

(58) Field of Classification Search
CPC ....... H04Q 11/0067; H04Q 2011/0073; H04Q 2011/0086; H04B 10/27; H04L 63/0414; H04L 47/2416; H04L 63/0272
See application file for complete search history.

(56) References Cited

U.S. PATENT DOCUMENTS

| | | | |
|---|---|---|---|
| 6,693,878 B1 * | 2/2004 | Daruwalla | H04L 12/2801 370/235 |
| 2002/0141421 A1 * | 10/2002 | Dupont | H04Q 11/0478 370/403 |
| 2004/0223500 A1 * | 11/2004 | Sanderson | H04L 63/0272 370/395.53 |

(Continued)

OTHER PUBLICATIONS

Prommak et al., "Load distribution-survivable lightpath routing for the optical virtual private network," Workshop on High Performance Switching and Routing, Merging Optical and IP Technologie Year: 2002 | Conference Paper | Publisher: IEEE.*

(Continued)

*Primary Examiner* — Roderick Tolentino

(57) ABSTRACT

A digital optical data network system for improving information security in Passive Optical Networks ("PON") by providing virtual information separation in the router, such as a premise router, or routers interfacing the entire PON, such as by utilizing virtual routing and forwarding, thus allowing safe data traffic between multiple carriers, service providers accessing the PON and multiple end users on the PON such as tenants in a building, employees of a business entity, or subscribers in a residential community.

9 Claims, 6 Drawing Sheets

Related U.S. Application Data filed as application No. PCT/US2013/053389 on Aug. 2, 2013, now abandoned.

(60) Provisional application No. 61/678,977, filed on Aug. 2, 2012.

(56) References Cited

U.S. PATENT DOCUMENTS

| | | | | |
|---|---|---|---|---|
| 2007/0092249 | A1* | 4/2007 | Akasaka | H04J 14/0282 398/49 |
| 2008/0212598 | A1* | 9/2008 | Kolli | H04L 29/12933 370/409 |
| 2008/0273877 | A1* | 11/2008 | Palacharla | H04J 14/0282 398/64 |
| 2011/0206370 | A1* | 8/2011 | Suvakovic | H04Q 11/0067 398/25 |
| 2012/0014693 | A1* | 1/2012 | Cheng | H04J 14/0282 398/34 |
| 2012/0128349 | A1* | 5/2012 | Mitsunaga | H04J 14/0268 398/25 |
| 2013/0010640 | A1* | 1/2013 | Higuchi | H04L 12/4641 370/254 |
| 2013/0084063 | A1* | 4/2013 | Hu | H04L 49/10 398/2 |

OTHER PUBLICATIONS

Kim et al., "Design and implementation of ME-VPNS," 2012 14th International Conference on Advanced Communication Technology (ICACT) Year: 2012 | Conference Paper | Publisher: IEEE.*

* cited by examiner

MUTUALLY SECURE OPTICAL DATA NETWORK AND METHOD

PRIOR APPLICATION

This is a continuation of U.S. patent application Ser. No. 17/128,042, filed 2020 Dec. 19, which is a continuation of U.S. patent application Ser. No. 16/600,302, filed 2019 Oct. 11, now U.S. patent Ser. No. 10/904,649, issued 2021 Jan. 26, which is a continuation of U.S. patent application Ser. No. 16/431,602, filed 2019 Jun. 4, which is a continuation-in-part of U.S. patent application Ser. No. 15/351,315, filed 2016 Nov. 14, which is a continuation-in-part of U.S. patent application Ser. No. 14/419,092, filed 2015 Feb. 2, which is a 371 of International Application Serial No. PCT/US2013/053389, filed 2013 Aug. 2, which claims the benefit of U.S. Provisional Patent Application Ser. No. 61/678,977, filed 2012 Aug. 2 all of which are incorporated herein by reference.

FIELD OF THE INVENTION

The instant invention relates to computer networks and more particularly to optical data network traffic routing to multiple users in a local area.

BACKGROUND

Nowadays a wide variety of entities are moving towards the use of Passive Optical Networks ("PON") and benefit from the interconnectivity provided by local and wide area networks, and connection to the Internet. Many entities depending on their purpose have many types of devices connected to the network including personal computers, wireless controllers, application servers, printers, scanners, ambient control systems, security cameras and sensors, phone systems, gaming consoles and television sets. The digital signals carried by the PON include converged voice, data and video signal content traffic.

Many individual and business users send and receive digital information which is intended to remain private and can be confidential to the individual users. Such users can be businesses located in the same office building as co-tenants, guests located in a hotel, users located in a commercial, local, state, federal or similar entity, subscribers in a residential entity such as owners or tenants. In the past, reasonable privacy and security can be accomplished by each user connecting directly to a secure service provider carrier using a dedicated headend located in the entity space including a modem, workgroup switches and routing equipment. This equipment typically requires its own cooling equipment. Often the connection throughout the local network and to the carrier is through copper wiring which, due to its electrical resistance, can generate additional heat requiring cooling. All this equipment and cooling capability is often multiplied by the number of individual tenants in a building, leading to high power consumption.

A typical limiting factor using copper wiring for digital connection lines is bandwidth. Thus, a particular business tenant may elect to upgrade its individual local network and its connection to the carrier using high bandwidth equipment. Increasing the bandwidth often requires additional copper wiring, and more air conditioning.

With the development of optical fiber technology, photonic networks which are typically referred to a Passive Optical Networks can deliver significantly higher bandwidth and lower power consumption. This need for increased speed and sustainability by reduced power consumption has promoted the accelerated adoption of PON in most commercial and residential sectors.

The higher available bandwidth has led to network designs where one or more PON interface routers can distribute data streams to a multiplicity of users through an Optical Line Terminal ("OLT"). Further, this can eliminate the need for a dedicated router for each user. Unfortunately however, this creates an increased cyber-security risk for all those users connected to the PON interface routers since the global routing table can be surreptitiously accessed by a nefarious user, or some cyber-entity mimicking a user on the PON.

The instant invention results from efforts to provide an improved passive optical networking system that addresses one or more of the above problems.

SUMMARY

The primary and secondary objects of the invention are to provide an improved optical networking system. These and other objects are achieved by providing an optical network interface router including at least one virtual routing table for each of a plurality of optical network units to which the interface router is connected.

In some embodiments there is provided a multi-user optical data network apparatus comprises: a plurality of network service carrier lines connected to a passive optical network interface router; at least one uplink connecting said interface router to an optical line terminal; said optical line terminal being connected to a number of passive optical network feeds for carrying a common data feed to a plurality of optical network units each supporting at least one of a plurality of private user devices; said interface router being configured to have at least one virtual routing table for each one of said plurality of optical network units; and, wherein each of said optical network units is adapted to extract data packets intended for a supported one of said devices.

In some embodiments said interface router is a premise router.

In some embodiments said interface router is further configured to have a routing table routine generating said at least one virtual routing table for each one of said plurality of optical network units.

In some embodiments each of said optical network units provides service to a separate number of private users.

In some embodiments said uplink carries data including digitized voice and video data.

In some embodiments there is provided a multi-user optical data network apparatus comprises: a plurality of network service carrier lines connected to a plurality of passive optical network interface routers; a plurality of uplinks connecting said interface routers to an optical line terminal; said optical line terminal being connected to a number of passive optical network feeds for carrying a common data feed to a plurality of optical network units each supporting at least one of a plurality of private user devices; wherein each of said interface routers is configured to have at least one virtual routing table for each one of said plurality of optical network units to which said each of said interface routers is connected; and, wherein each of said optical network units is adapted to extract data packets intended for a supported one of said devices.

In some embodiments there is provided a digital data network communication method comprises: accepting a plurality of private data streams into a passive optical network interface router serving a plurality of private users through a plurality of optical network units; aggregating said private data streams into a combined data feed; routing said data feed to at least two of said plurality of optical network units; extracting from said data feed a first one of said private data streams; wherein said routing comprises: generating an independently unique virtual routing table for each of said plurality of optical network units; tagging ethernet frames intended for a first one of said plurality of optical network units according to entries in a first one of said virtual routing tables associated with a first one of said optical network units; distributing said tagged ethernet frames according to said first one of said virtual routing tables.

In some embodiments said distributing comprises associating destinations listed in said first one of said virtual routing tables with said first one of said optical network units.

In some embodiments each of said optical network units provides service to a separate number of private users.

In some embodiments said accepting comprises: interfacing a plurality of service provider data lines through a single headend.

In some embodiments said interfacing comprises: utilizing at least one premise router and a radio frequency video converter; and, feeding an output of said at least one premise router through an optical line terminal.

In some embodiments said interfacing further comprises: feeding an output of said converter through said optical line terminal.

In some embodiments said aggregating comprises using an enterprise aggregating switch.

The text of the original claims is incorporated herein by reference as describing features in some embodiments.

DESCRIPTION OF THE EXEMPLARY EMBODIMENTS

Figure 1:
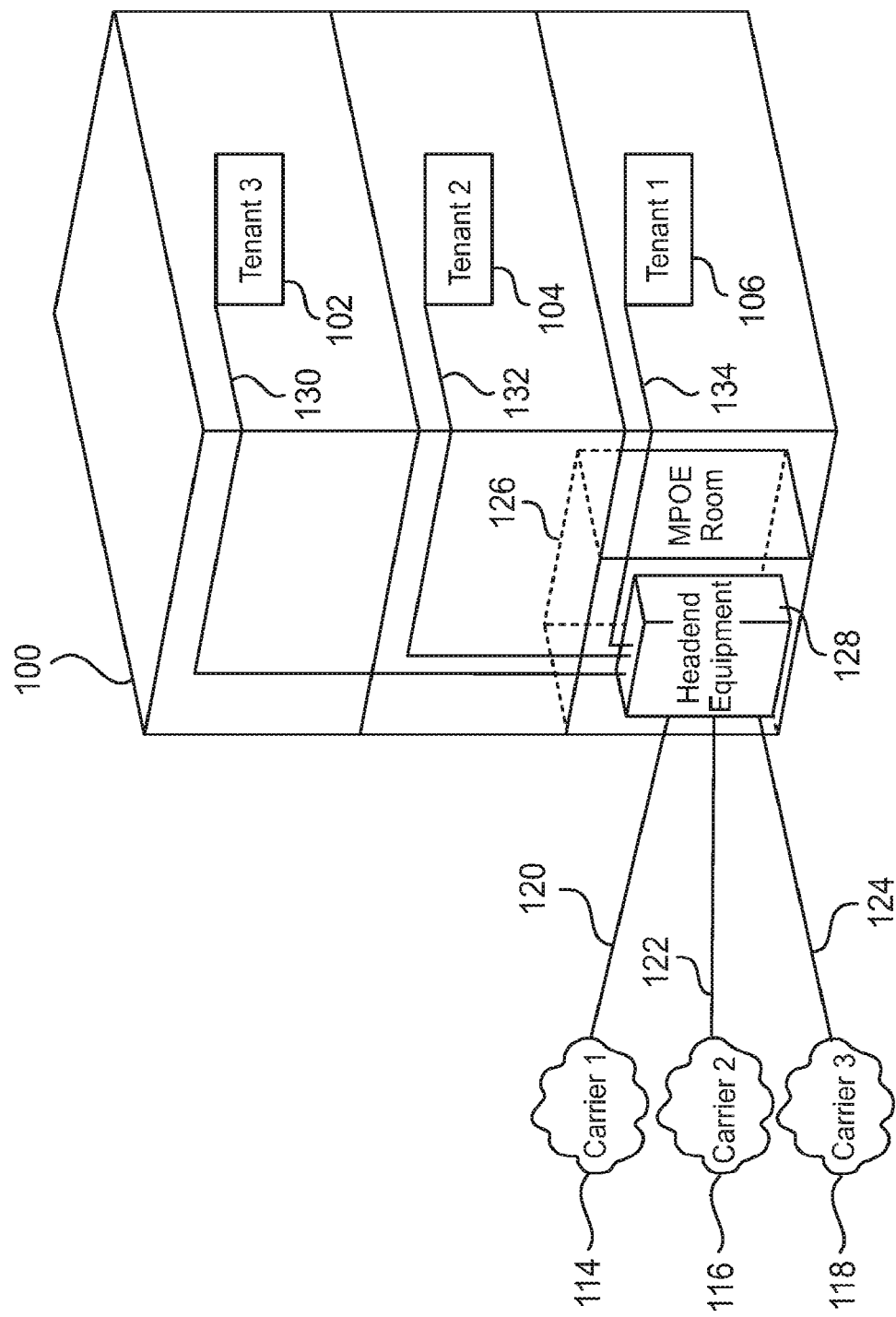
FIG. 1 is a functional block diagram of several data service providers supplying multi-tenant building through a single headend according to an exemplary embodiment of the invention.

Referring now to the drawing, there is illustrated in FIGS. 1-6 the components of a system 1 used to provide a mutually secure, shared Local Area Network ("LAN") implementation which can supply a multi-tenant site such as an office building 100 with converged voice, data and video signal content traffic at gigabit speeds to a plurality of mutually secure end point users such as building tenants having multiple end user devices such as computers, access points and wireless controllers, application servers and printers, and television sets.

As shown in FIG. 1, a single building 100 can have multiple tenants 102, 104, 106 such as individual companies, each potentially having multiple digital network devices. The system offers each tenant the ability to specify and use their own private address space even if the data feed overlaps with neighboring tenant on the same network, and the transmission of converged content traffic over the shared infrastructure while maintaining the separation and security of the individual tenant content traffic.

The system relies upon a collection of standards-based technologies that are designed and implemented to provide a point-to-multipoint networking through a single aggregation switch that is capable of providing thousands of IP voice, data, and video connection ports.

In a basic configuration, the aggregate downstream rate can be 2.5 Gbps, while the upstream rate can be 1.25 Gbps. Each of the connections can be adapted to support high-bandwidth multimedia applications on a single optical fiber over a distance of 20 km or more. Telecommunications service traffic that includes Internet, public switched telephone networks, and broadcast/cable television 108, 110, 112 for the building are provided by one or more commercial carriers 114, 116, 118. The telecommunications services carrier lines 120,122,124 enter the building 100 at a Main Point Of Entry (MPOE) room 126 and terminate into headend equipment 128. From the headend equipment, the voice, video and data content traffic can distributed to each of the tenants 102, 104, 106 over data feeds carried by fiber optic cabling 130, 132, 134.

Figure 2:
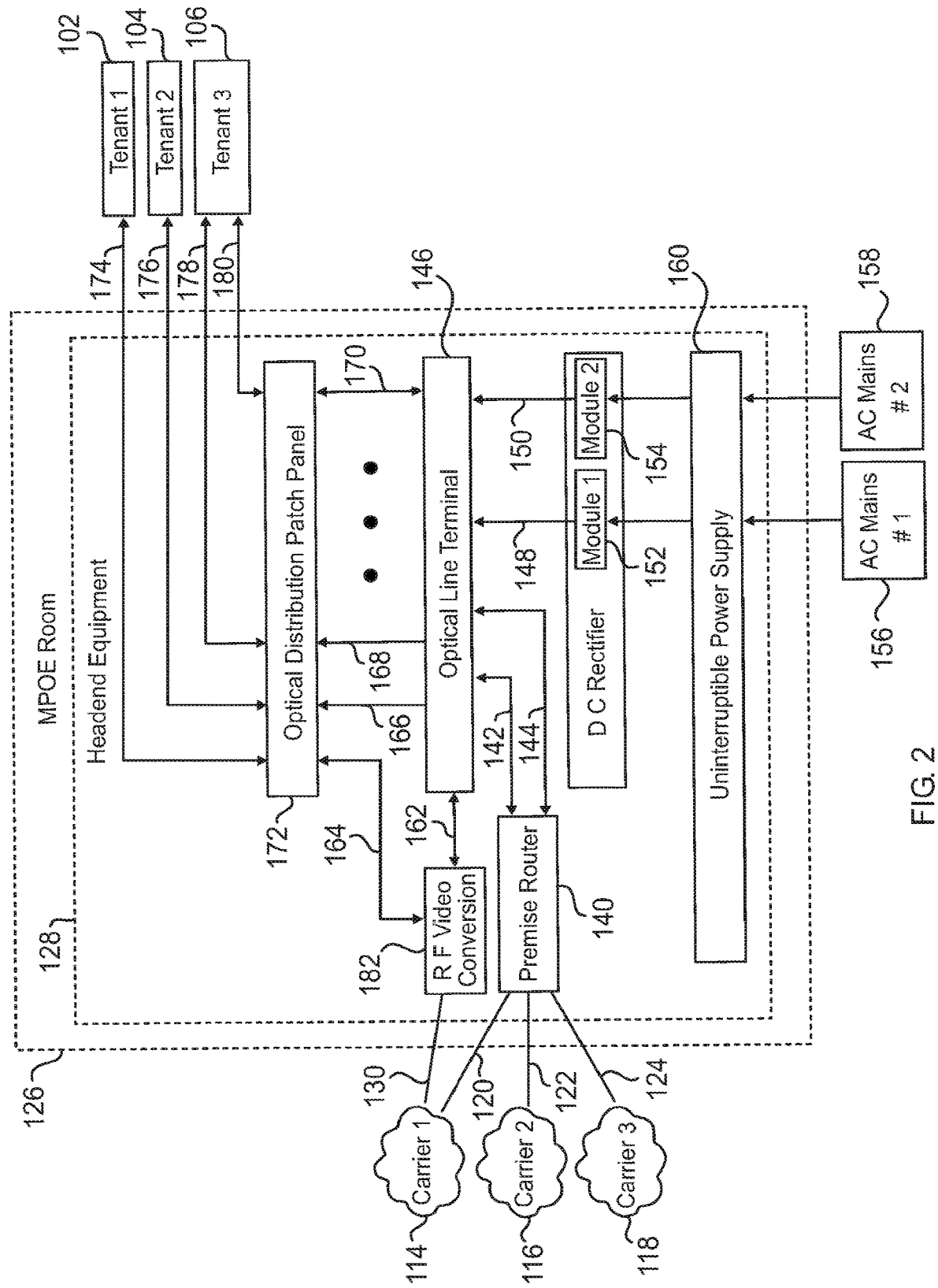
FIG. 2 is a functional block diagram of main point of entry room for the data network servicing a multi-tenant building according to an exemplary embodiment of the invention.

As shown in FIG. 2, the secure, shared multi-tenant LAN architecture can include a Passive Optical Network ("PON") interface router, which for clarity in this embodiment is a single premise router 140, an aggregation switch referred to as an Optical Line Terminal (OLT) 146, a plurality of end user terminal devices such as computers, telephones and televisions located within the physically separate tenant 102, 104, 106 spaces, and an optical distribution network that consists of splitters and fiber cabling infrastructure. It shall be understood that a plural number of interface routers such as premise routers can be used.

The headend equipment 128 receives the plurality of telecommunications service carrier lines 120,122,124 from the separate carrier providers 114, 116, 118. An RF-based video signal can be supplied by one or more of the carriers to the headend equipment via a broadband coaxial cable 130. The interface to the carrier lines within the headend equipment is the premise router 140.

The premise router 140 can be configured with Virtual Routing and Forwarding (VRF) as described in RFC 4381 and RFC 4382, and utilizes Virtual Local Area Network (VLAN) tagging to separate and manage the distribution of the voice, video and data content traffic to each of the users. The VLAN-tagged voice, video, and data content traffic is connected to the Optical Line Terminal (OLT) 146 through an uplink 142 that provides primary communication. Optionally, a secondary uplink 144 may be employed as a backup communication path.

The OLT 146 can be powered by dual 48 VDC power feeds 148, 150 from rectifier modules 152, 154 that are attached to separate AC Mains 156, 158 through an uninterruptible power supply 160. The OLT has a minimum of eight optical ports, but can have well over fifty such ports. Each port delivers a beam of light that contains the aggregated data for a multiplicity of users. The aggregated data may or may not be encrypted based on the type of PON.

The OLT 146 takes the VLAN-tagged voice, video, and data content traffic 142, 144 and processes each of the ethernet frames by first optionally encrypting them, then converting them into light, and outputting them as a photonic broadcast stream to the appropriate initial passive optical network feeds 162, 164, 166, 168, 170 that connects to an optical distribution patch panel 172. The optical distribution patch panel 172 is used to provide the ability for cross-connecting the initial feeds 162, 164, 166, 168, 170 to the distribution feeds 174, 176, 178, 180 that traverse the distance to the remotely located tenants 102, 104, 106. A tenant 106 requiring larger bandwidth can accept multiple distribution feeds 178, 180.

In the case where a carrier provider 114 supplies an RF-based video signal 130, the headend equipment 128 receives the RF-based video signal and converts it into light by processing the electrical analog signal and using it to modulate a laser which outputs the equivalent video photonic stream. This new video photonic stream is then combined with an initial feed 162 which results in a modified initial feed 164 that contains a photonic broadcast stream that contains the voice, video and data content traffic that is then fed into the optical distribution patch panel 172. Of course in some instances the initial feed can contain digitized voice, video and data in which case no bypass of the OLT is necessary.

Figure 3:
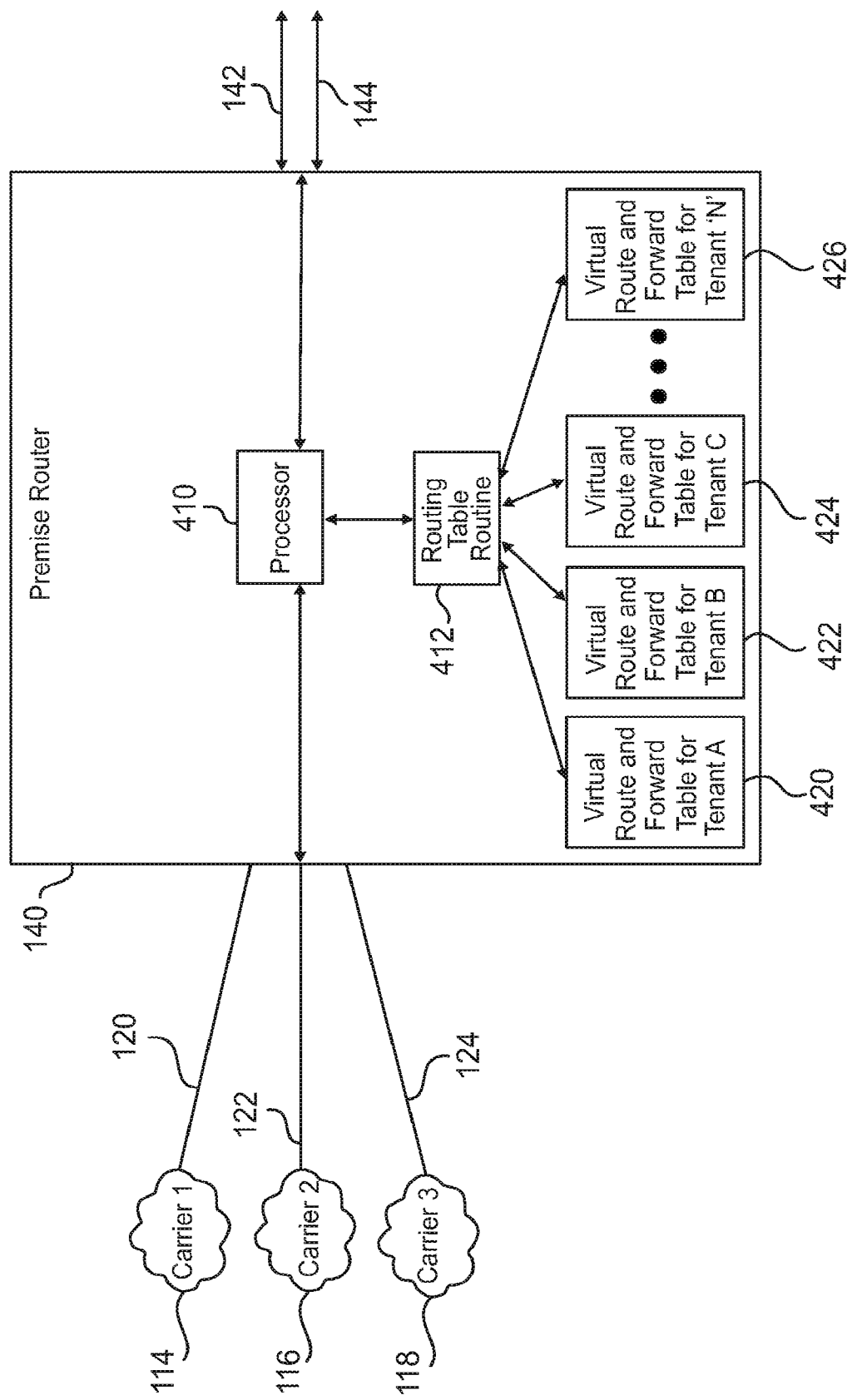
FIG. 3 is a functional block diagram for a premise router according to an exemplary embodiment of the invention.

As shown in FIG. 3, the premise router 140 can be the interface to each of the commercial carrier providers 114, 116, 118 through either a packet-switched or a leased-line Wide Area Network (WAN) interface in order to utilize the telecommunications services provided over carrier lines 120, 122, 124. Logical circuits can make connections between the premise router 140 and carrier providers 114, 116, 118, utilizing a shared-bandwidth connection that may be shared with other carrier customers and could potentially affect quality of service and bandwidth availability. The leased-line connection provides a direct interface access to the carrier and eliminates the possibility of being affected by other carrier customers. The premise router 140 can be configured to run a routing table routine 412 that accesses the virtual routing table instantiations to create virtual routing tables 420, 422, 424, 426 for each Optical Network Unit (ONU) serving a tenant. This configuration provides for creation of multiple routing tables, one for each ONU, within the single premise router 140. This capability supports the overlapping of IP addresses for any of the tenants because the routing instances are independent. In this way, data traffic intended for one tenant is automatically isolated from traffic intended for other tenants. Furthermore, queries emanating from one tenant are identified so that one tenant cannot mimic the identity of another. In other words, unique routing for each tenant effectively isolates its traffic from other tenants, vastly improving the networks defense against cyber-attack.

Thus, the premise router processor 410 gets and puts the tenant-specific routing information through the routing table routine 412 into the appropriate virtual routing tables 420, 422, 424, 426. The updated virtual routing tables are used to uniquely VLAN-tag the voice, video, and data content traffic that is sent and received through the uplinks 142, to the OLT 146.

In this way, the overlapping IP address on a single PON infrastructure allows each tenant connected to the infrastructure to transmit and receive information to any of the carriers. Thus all the tenants in a building can simply connect to the PON infrastructure without the need for their own dedicated headend.

A configuration file loaded into the premise router contains the commands to implement the virtual routing tables for each of the ONUs providing service to the tenant users. By way of example, the following pseudo-code implements independent virtual routing tables for two ONUs serving two users, namely "Tenant A" and "Tenant B". Comment lines begin with an exclamation point ("!"):

!---Begin gateway configuration and programming
!---Configure gateway identity
!---Establish express forwarding to optimize network performance and scalability
!---For each tenant (1 . . . n) Do
!---Instantiate virtual route table for the Tenant
!---Enable VPN (Virtual Private Network) for the Tenant
!---Establish routing and forwarding for the virtual routing table
!---Creates lists of import and export route-target extended communities
!---End Do
!---Set IP (Internet Protocol) address, netmask and enable IS-IS routing
!---For each tenant (1 . . . n) Do
!---Establish loopback identifier for the Tenant
!---Enable VRF (Virtual Routing and Forwarding) for the Tenant
!---Associate the VRF instance with an interface or sub-interface.
!---Loopbacks use the same IP address because they belong to different Tenant VRF's
!---Broadcast to all hosts on the subnet
!---End Do
!---Define and configure the gateway ingress interface
!---Set bandwidth
!---Config IP address and netmask
!---Enable MPLS (MultiProtocol Label Switching)
!---Enables logging of BGP (Border Gateway Protocol) neighbor resets.
!---Adds an entry to the BGP or multiprotocol BGP neighbor table
!---Enables BGP sessions to use a specific operational interface for TCP (Transmission Control Protocol) connections
!---Enter address family configuration mode
!---Sends the community attribute to a BGP neighbor
!---For each tenant (1 . . . n) Do
!---Set the address family for the tenant
!---End Do
!---Use longest prefix matching or default route
!---end gateway configuration and programming The above example shows that the premise router 140 can be programmed to create an independent virtual routing table for each user ONU. Thus, each user is effectively encased within its own separate routing environment, vastly restricting access by cyber attackers to the PON.

Figure 4:
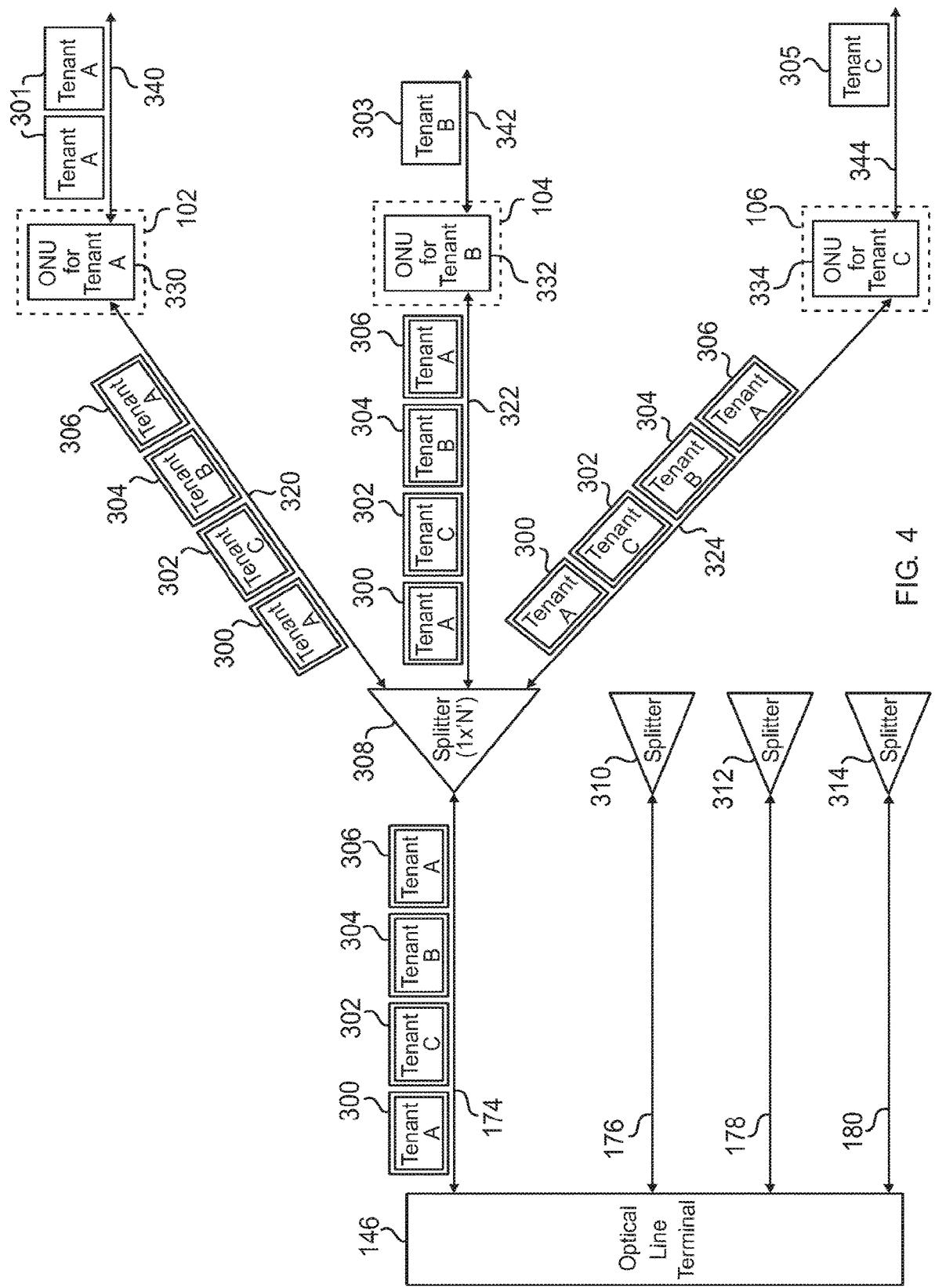
FIG. 4 is a functional block diagram of an optical line terminal servicing multiple tenant users with a common data feed according to an exemplary embodiment of the invention.

FIG. 4 represents the Passive Optical Network infrastructure which is an optical distribution network used to convey the photonic broadcast stream feeds that contain the encrypted data packets such as VLAN-tagged ethernet frames 300, 302, 304, 306 that are distributed back and forth between the various tenant spaces 102, 104, 106 and the OLT 146. Essentially, the OLT can broadcast the combined encrypted VLAN-tagged ethernet frames 300, 302, 304, 306 over the distribution feeds 174, 176, 178, 180 to a number of splitters 308, 310, 312, 314.

Each splitter 308 can replicate the incoming photonic broadcast stream equally over each of it's drop lines 320, 322, 324. The splitter 308 can attach to the simplex, single-mode fiber from the OLT 146 and can passively redistribute the incoming light stream up to 64 times. The splitter is a Planar Lightwave Circuit (PLC) that is constructed using silica glass waveguide circuits and aligned fiber optic pigtails that are all integrated inside of a single package. The attenuation of the light signal through the PLC of the splitter 308 is symmetrical in both directions. The signal loss from a 1×8 PLC splitter is expected to be less than one dB greater than what would be expected from a perfect splitter, approximately 10 dB. A typical 1×32 PLC splitter shall have approximately 17 dB or less.

Each of the outputs from the optical splitter can be an individual simplex, single-mode fiber called a drop line 320, 322, 324. The drop lines can be routed and fed into the appropriate tenant physical space 102, 104, 106 and terminated into the tenant's dedicated Optical Network Unit (ONU) 330, 332, 334.

Each ONU 330, 332, 334 is operated so that it utilizes the VLAN-tagging to select those of the incoming ethernet frames assigned to the particular tenant, and then removes the encryption from the selected ethernet frames. Thus, each ONU strips out or extracts only those incoming frames that are intend for the particular tenant. The decrypted ethernet frames 301, 303, 305 are then made available 340, 342, 344 for the tenant's IP/ethernet end-user equipment. Those frames not assigned to the particular tenant are ignored and cannot be decrypted by the particular tenant. In other words, a first subset of the frames can be associated a first piece of end-user equipment and a second subset of the frames is associated with a second piece of end-user equipment. The first and second pieces of equipment can be common to a single tenant or can be split among separate tenants.

In other words, for example, tenant A 102 gets supplied to its ONU 330 all incoming encrypted frames 300, 302, 304, 306 via its drop line 320 including those frames that are intended for it 300, 306 and those frames that are unintended for it 302, 304. The ONU strips out its intended encrypted frames 300, and 306 and decrypts them to form its intended decrypted frames 301 which it makes available to Tenant A's dedicated, private data line 340. The ONU also encrypts outgoing frames.

Figure 5:
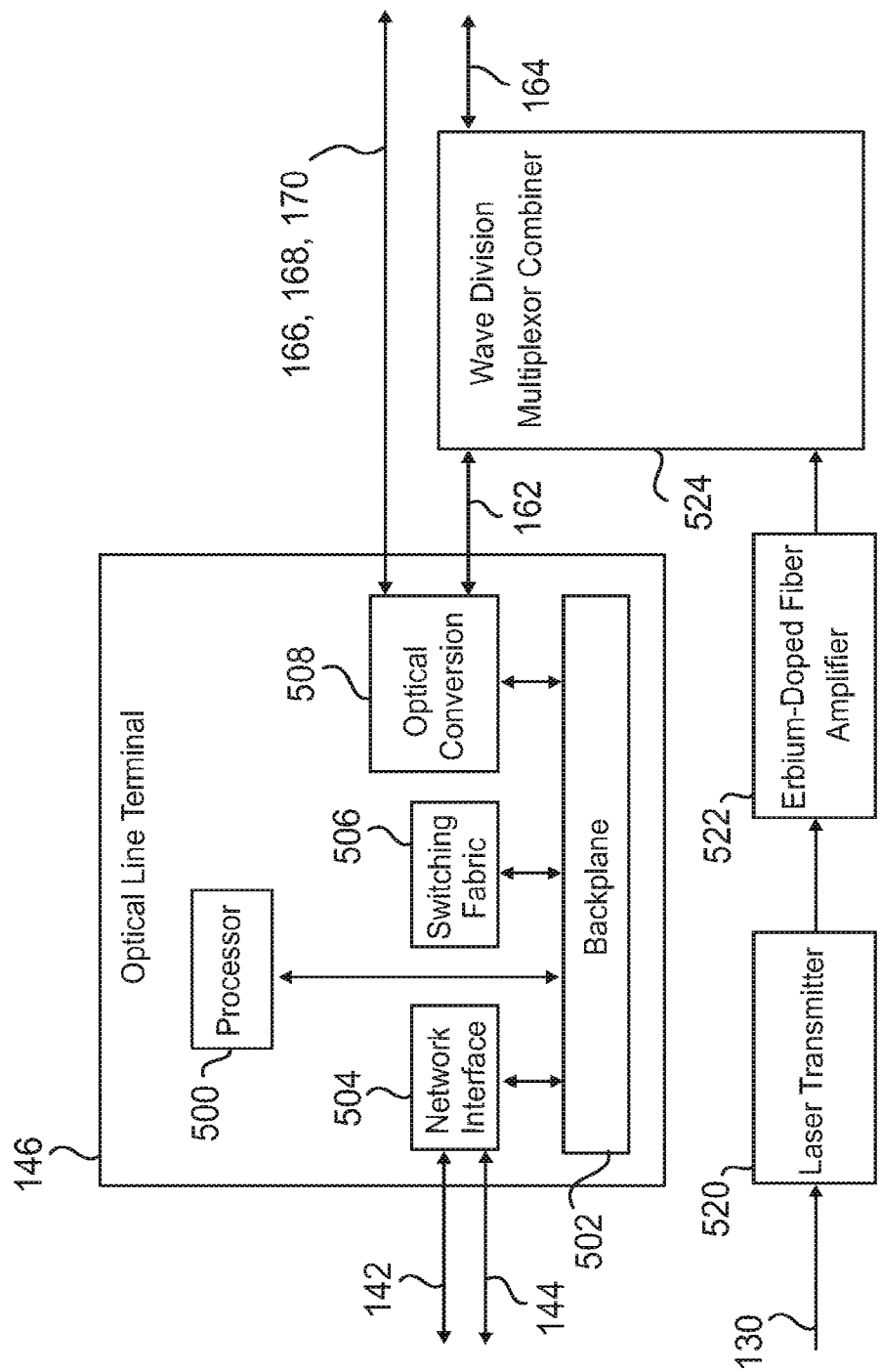
FIG. 5 is a functional block diagram of an optical line terminal aggregating data and video streams into a common optical data feed according to an exemplary embodiment of the invention.

As shown in FIG. 5, the OLT 146 that typically resides in the MPOE room 126 can be a key component of the headend equipment 128. The OLT 146 can perform as the Layer-2 workgroup switching mechanism for voice, video and data content traffic that is sent and received from the individual tenants.

The OLT 146 equipment can be a chassis having multiple slots used to host circuit boards that perform various functions. Operations of the OLT are managed and controlled by a processor 500. A backplane 502 of the OLT can provide the communication path for all of the control, management, and data signals between the circuit boards installed within the OLT. A network interface 504 provides the interface to/from the primary uplink 142 and backup uplink 144 connections to the premise router 140. A switching fabric component 506 can be used to encrypts the VLAN-tagged ethernet frames using the appropriate symmetric key for a specific tenant and sends the result to an optical conversion component 508 for transmission to the tenant. The content traffic on the switching fabric component 506 is encrypted for each tenant location before being transmitted over the shared optical distribution network. Encryption of the layer-2 ethernet frames is used to provide the confidentiality of each tenant's signal traffic.

A symmetric-key algorithm can be used for the encryption of the ethernet frame data packets. This particular implementation utilizes a fixed block size of 128-bits and a key size of 128-bits that operate on a 4×4 column-major order matrix of bytes. It performs 10 cycles of transformation rounds that convert the input plaintext into the final output of ciphertext. Each round can consists of:
 a. First, a byte substitution function is performed where each byte in the state matrix is replaced using an 8-bit substitution.
 b. Next, each of the rows of the state are shifted by a certain number of steps. The first row is left unchanged. Each byte of the second row is shifted one to the left. Similarly, the third and fourth rows are shifted by offsets of two and three respectively. Row n is shifted left circular by n−1 bytes.
 c. Finally, the columns of the state are mixed by combining the four bytes in each column. The four bytes of each column of the state are combined using linear transformation. Encryption is used to specifically prevent man-in-the-middle attacks. Additionally, the PON configuration also supports IEEE 802.1x authentication in order to provide port based Network Access Control to limit network access, with features like IP//MAC address limiting to secure the network from unauthorized/malicious users.

The optical conversion component 508 of the OLT 146 can convert the electrical signals of the encrypted VLAN-tagged ethernet frames and output them over the initial feeds 162, 166, 168, 170 as modulated optical signals.

In the case where a carrier provider 114 supplies an RF-based video signal 130 to the headend equipment 128, the signal is connected to a laser transmitter 520 where the input broadband signal is used to modulate a laser. The modulated output of the laser is a low-level photonic light stream. The photonic light stream is sent to an erbium-doped fiber amplifier 522, where the signal is increased to approximately 30 dBmV. The resulting amplified video signal is then overlayed on an initial feed 162 through the use of a wave division multiplexor combiner 524. The output from the wave division multiplexor combiner 524 is a feed line 164 that contains encrypted VLAN-tagged ethernet frames and a laser-modulated, RF-based video signal.

Figure 6:
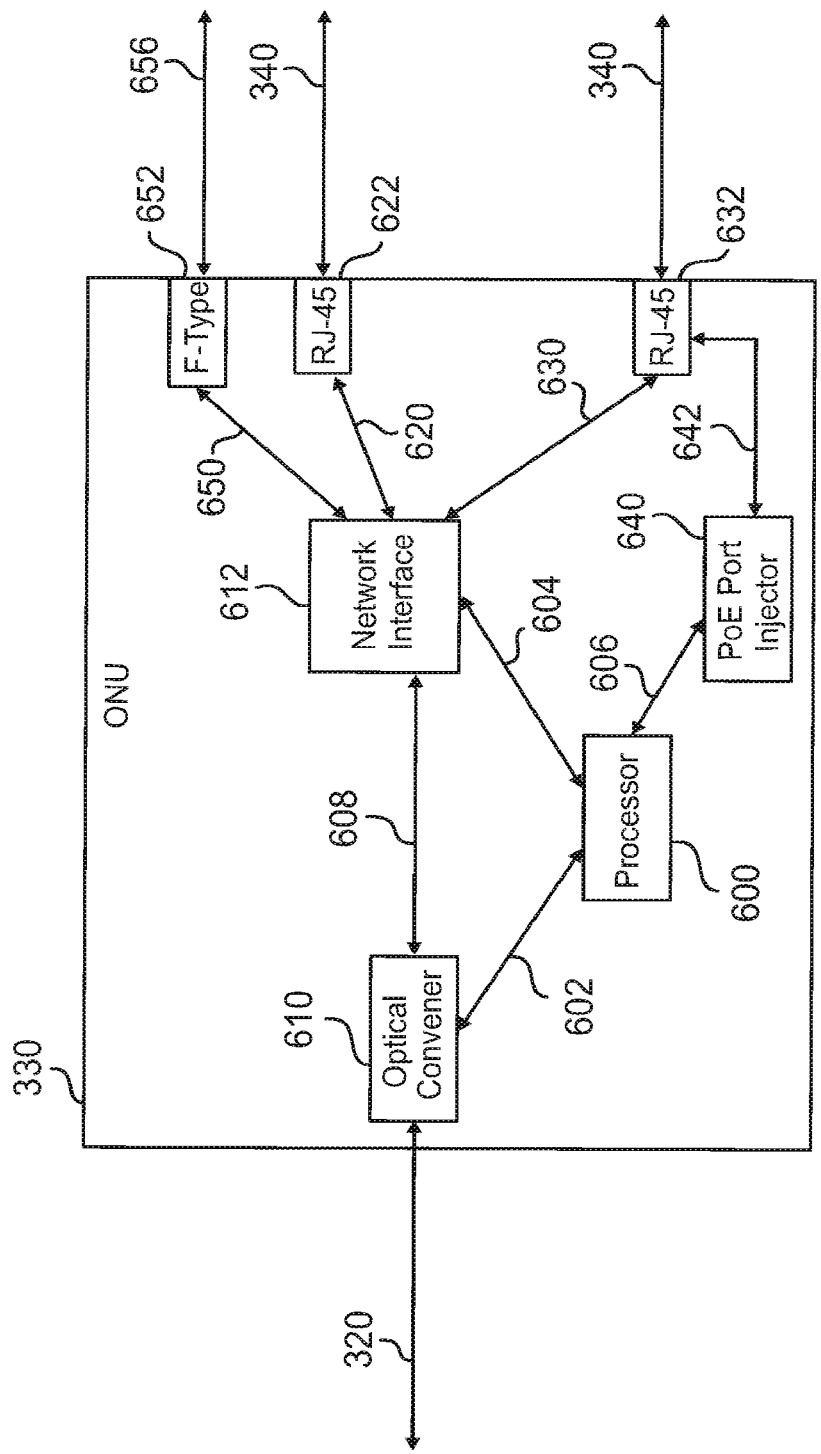
FIG. 6 is a functional block diagram of an optical network unit interfacing a tenant private network with a common optical data feed according to an exemplary embodiment of the invention.

As shown in FIG. 6, each tenant can have one or more of an ONU 330 that accepts drop line 320 connections. The ONU 330 terminates optical fibers from a splitter 308 and sends/receives decrypted ethernet frames 340 to the tenant's IP/ethernet equipment, and RF video signals 656 to the tenant's television. The ONU has a processor 600 which controls and manages all activity of the ONU by directly communicating all of the control and management signals 602, 604, 606 to/from its internal components 610, 612, 640. The ONU receives the photonic light stream transmitted over the drop line 320. The optical converter 610 examines the encrypted photonic light stream that enters the component. If the VLAN-tagged ethernet frame has been encrypted with the same symmetric key, it indicates that the VLAN-tagged frame belongs to the tenant of that ONU. After the optical converter 610 performs the decryption, the VLAN-tagged ethernet frame is sent to the network interface 612 of the ONU via the direct communication path 608. The network interface 612 demultiplexes the electrical signal to divide out baseband telephony/data signals from broadband video channels. The network interface sends/receives the VLAN-tagged ethernet frames to the appropriate physical connection interface 622, 632, 652. The ONU can supply a basic 802.3 ethernet interface 622, or an 802.3 ethernet interface that include power-over-ethernet (PoE) capability 632, or an RF-based video F-Type interface 652 to transmit the RF-based video signal 656. The PoE port injector 640 implements the Power-Over-Ethernet and Power-Over-Ethernet Plus based upon the IEEE 802.3af-2003 and IEEE 802.3at-2009 standards respectively.

In this way, the above described system empowers a multi-tenant building 100 with an environment to securely host individual tenant data traffic with overall network flexibility. This ability of the system allows it to leverage the high bandwidth and energy efficiency of passive optical network equipment for the entire building. Because optical bandwidth is comparatively unlimited, existing systems often do not utilize this capacity. Thus, the high bandwidth capability of optical fiber can be leveraged to route all traffic optically and uniformly throughout the building on an aggregated feed. Each tenant can extract its share of the traffic from the feed. In this way, a single headend having reduced air conditioning requirements can be located at the building's main pint of entry, and no additional air conditioning is needed at the individual tenant spaces for what would have been headend-type network equipment.

While the preferred embodiment of the invention has been described, modifications can be made and other embodiments may be devised without departing from the spirit of the invention and the scope of the appended claims.

What is claimed is:

1. A digital data network communication method comprises:
    accepting a plurality of data streams into a primary passive optical network (PON) interface router, interconnected with a secondary PON interface router serving a plurality of user devices through a plurality of optical network units (ONUs);
    configuring said primary PON interface router to virtually separate the information intended for at least one private user device of a plurality of user devices, wherein said at least one private user device of a plurality of user devices is connected to at least one of said plurality of ONUs;
    wherein said configuring comprises:
    generating at least one independently unique virtual routing table by using Virtual Routing and Forwarding (VRF);
    virtually separating at least one private data stream intended for said at least one private user device from said plurality of data streams using said at least one independently unique virtual routing table to create at least one virtually separated private data stream containing Internet Protocol (IP) data packages;
    uniquely labelling said IP data packages contained in said at least one virtually separated private data stream using Multi-Protocol Label Switching (MPLS) to create MPLS labelled data packages;
    sending said plurality of data streams, including said at least one virtually separated private data stream comprising said MPLS labelled data packages, to said secondary PON interface router;
    receiving said plurality of data streams including said at least one virtually separated private data stream at said secondary PON interface router;
    converting said MPLS labelled data packages contained within said at least one virtually separated private data stream back to said IP data packages;
    forwarding said plurality of data streams including said at least one virtually separated private data stream containing said IP data packages from said secondary PON interface router to a PON optical line terminal (OLT);
    aggregating within said PON OLT said plurality of data streams and said at least one virtually separated private data stream into a common data feed;
    distributing said common data feed to said plurality of ONUs;
    wherein said distributing comprises:
    replicating said common data feed using at least one optical splitter connected to said plurality of ONUs;
    delivering said common data feed to said plurality of ONUs;
    extracting within said at least one of said plurality of ONUs, said at least one virtually separated private data stream including said IP data packages from said common data feed;
    sending said at least one virtually separated private data stream including said IP data packages from said at least one of said plurality of ONUs to said at least one private user device of a plurality of user devices.

2. The method of claim 1, wherein said at least one of said plurality of ONUs provides services to at least one private user a of plurality of users.

3. The method of claim 1, wherein said secondary PON interface router is serially connected to at least one additional PON interface router that is serially connected to said PON OLT, wherein said least one additional PON interface router delivers said plurality of data streams including said at least one virtually separated private data stream containing said IP data packages to said PON OLT.

4. The method of claim 3, wherein said at least one additional PON interface router is serially connected to an aggregation switch that is serially connected to said PON OLT, wherein said aggregation switch delivers said plurality of data treams including said at least one virtually separated private data stream containing said IP data packages to said PON OLT.

5. A digital network communication method comprises:
    receiving from at least one passive optical network (PON) interface router out of a plurality of PON interface routers at a PON optical line terminal (OLT), at least one private data stream out of a plurality of data streams, wherein said at least one private data stream has been virtually separated using Virtual Routing and Forwarding (VRF) to form at least one virtually separated private data stream comprised of Internet Protocol (IP) data packages, and wherein said at least one virtually separated private data stream including said IP data packages is intended for at least one of a plurality of ONUs, and wherein said at least one of a plurality of ONUs serves at least one private user device of a plurality of user devices;
    aggregating within said PON OLT said plurality of data streams and said at least one virtually separated private data stream into a common data feed;
    distributing said common data feed to said plurality of ONUs;
    wherein said distributing comprises:
    replicating said common data feed using at least one optical splitter connected to said plurality of ONUs;
    delivering said common data feed to said plurality of ONUs;

extracting within said at least one of said plurality of ONUs, said at least one virtually separated private data stream including said IP data packages from said common data feed;

sending said at least one virtually separated private data stream including said IP data packages from said at least one of said plurality of ONUs to said at least one private user device of a plurality of user devices.

6. The method of claim 5, wherein said at least one of said plurality of ONUs provides services to at least one private user of a plurality of users.

7. The method of claim 5, wherein said at least one PON interface router is serially connected to an aggregation switch that is serially connected to said PON OLT, wherein said aggregation switch delivers said plurality of data streams including said at least one virtually separated private data stream comprising said IP data packages to said PON OLT.

8. A digital network communication method comprises:

receiving at a passive optical network (PON) optical line terminal (OLT), at least one private data stream out of a plurality of data streams, wherein said at least one private data stream has been virtually separated using Virtual Routing and Forwarding (VRF) to form at least one virtually separated private data stream comprised of Internet Protocol (IP) data packages, and wherein said at least one virtually separated private data stream including said IP data packages is intended for at least one of a plurality of ONUs, and wherein said at least one of a plurality of ONUs serves at least one private user device of a plurality of user devices;

aggregating within said PON OLT said plurality of data streams and said at least one virtually separated private data stream into a common data feed;

distributing said common data feed to said plurality of ONUs;

wherein said distributing comprises:

replicating said common data feed using at least one optical splitter connected to said plurality of ONUs;

delivering said common data feed to said plurality of ONUs;

extracting within said at least one of said plurality of ONUs, said at least one virtually separated private data stream including said IP data packages from said common data feed;

sending said at least one virtually separated private data stream including said IP data packages from said at least one of said plurality of ONUs to said at least one private user device of a plurality of user devices.

9. The method of claim 8, wherein said at least one of said plurality of ONUs provides services to at least one private user our of plurality of users.

* * * * *